United States Patent [19]

Stahl et al.

[11] 4,292,177
[45] Sep. 29, 1981

[54] PRESSURIZABLE ROTARY FILTER

[75] Inventors: Werner Stahl, Landau; Uwe Breuer, Gröbenzell; Bernhard Richter, Puchheim; Franz Alstetter; Franz Krappmann, both of Munich; Hans Schuster, Lohhof, all of Fed. Rep. of Germany

[73] Assignee: Krauss-Maffei Aktiengesellschaft, Munich, Fed. Rep. of Germany

[21] Appl. No.: 94,063

[22] Filed: Nov. 14, 1979

[30] Foreign Application Priority Data

Nov. 15, 1978 [DE] Fed. Rep. of Germany ....... 2849528

[51] Int. Cl.³ .............................................. B01D 33/28
[52] U.S. Cl. .................................. 210/325; 210/331; 210/346; 210/493.1; 210/333.1
[58] Field of Search ............... 210/323 R, 323 T, 325, 210/330, 331, 333 A, 340, 341, 346, 493 R

[56] References Cited

U.S. PATENT DOCUMENTS

| 988,107 | 3/1911 | Johnston | 210/330 |
|---|---|---|---|
| 1,036,847 | 8/1912 | Holland | 210/331 X |
| 1,812,042 | 6/1931 | Genter | 210/330 X |
| 1,826,485 | 10/1931 | Thorne | 210/331 |
| 2,593,707 | 4/1952 | Walker | 210/331 X |
| 2,682,954 | 7/1954 | Burman | 210/331 X |
| 3,513,643 | 5/1970 | Tarala | 210/493 R X |
| 3,972,817 | 8/1976 | Moe | 210/333 A X |
| 4,056,473 | 11/1977 | Nilsson | 210/331 |

FOREIGN PATENT DOCUMENTS

| 598878 | 5/1931 | Fed. Rep. of Germany | 210/331 |
|---|---|---|---|
| 599898 | 2/1932 | Fed. Rep. of Germany | 210/331 |
| 597650 | 3/1932 | Fed. Rep. of Germany | 210/331 |
| 617782 | 11/1932 | Fed. Rep. of Germany | 210/330 |

Primary Examiner—Robert H. Spitzer
Attorney, Agent, or Firm—Karl F. Ross

[57] ABSTRACT

A rotary filter has a pressure vessel and a rotor from which a plurality of filter cells are suspended from outer portions of the rotor so that they clear a conveyor located proximal to the axis of rotation and upon which the filter cake is removed. Conduits are connected to the filter cells from a single distribution head for initially evacuating the cells in the filter stage and thereafter pressurizing the cells to dislodge the filter cake while the vessel remains under pressure. The filter cells can have the filter surfaces extending generally in axial planes or in axially spaced relationship in planes wherein a plurality of angularly spaced filters extend generally radially from respective filtrate conduits running axially along the outer part of the rotor.

17 Claims, 8 Drawing Figures

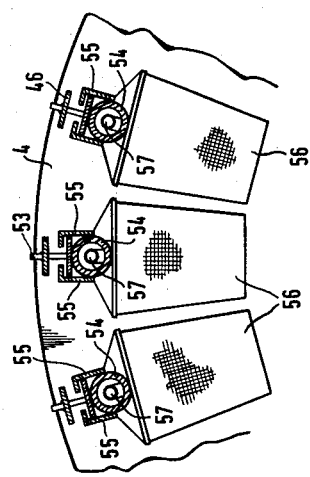
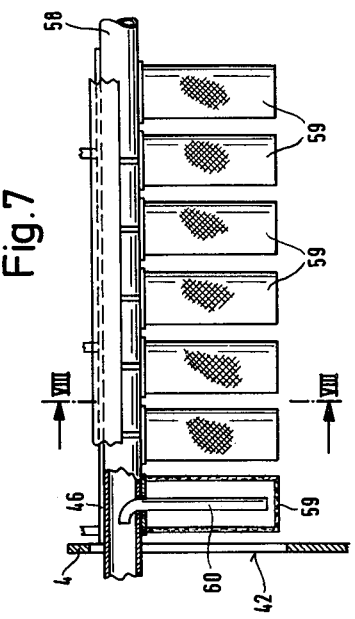
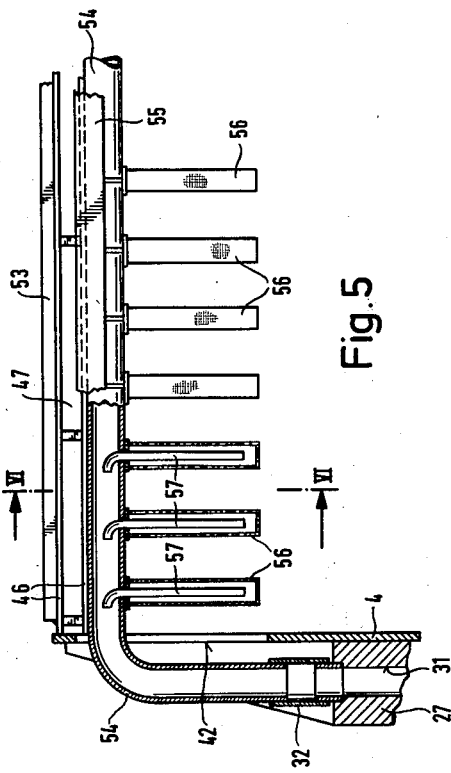

PRESSURIZABLE ROTARY FILTER

FIELD OF THE INVENTION

The present invention relates to a rotary filter and, more particularly, to a rotary-cell filter which can be pressurized, i.e. is received in a pressurizable vessel so that the external surfaces of the filter material are always maintained under a pressure applied to the vessel.

BACKGROUND OF THE INVENTION

Filtration under pressure has, inter alia, the advantage that a filtrate can be removed from solids in suspension with deposition of a filter cake upon a filter surface from a suspension of the solid phase in the liquid phase, while the liquid phase is under superatmospheric pressure, thereby avoiding or limiting evaporation of the liquid through all phases of the filtering operation including deposition of the filter cake, washing of the filter cake (if desirable) dislodgment of the filter cake from the filter surface with, possibly, intervening drying of the solids on the filter cake.

To this end filters have been provided within a pressurizable vessel (see *Information Chimie*, No. 145, June 1975, pp. 302–304.

In these earlier rotary cell filters, the filter cells, extending radially outwardly from the hub or shaft of the rotor, are, as the latter rotates, immersed in the suspension which is received in a trough and consists of the solid and liquid phases, whereupon a pressure differential is applied across the filter material of the cell inducing the filtrate to pass through and resulting in the collection of a filter cake upon the surface. The differential is produced by reducing the pressure in the filter cell below that prevailing in the vessel and thereby effectively evacuating the cell. This positive or inward pressure differential drives the filtrate through the filter material and permits the filtrate to be withdrawn.

At a subsequent point the travel of the filter cells, i.e. of rotation of the rotor, the filter cells are withdrawn from the suspension and the filter cake is removed from the filter material either by a mechanical stripping of by raising the pressure within the filter cells to a level above that prevailing in the pressurizable vessel, thereby applying an outward or negative pressure differential which dislodges the filter cake. The pressure in both cases can be created by compressed air and the reduced pressure can be created by communicating atmospheric or ambient pressure to the filter cells. The negative pressure differential can result in a pressure wave or shock to effect this dislodging of the filter cake.

Prior to removal of the filter cake filter material, the filter cake can be subjected to various treatments on the filter cells, e.g. a washing whereby the filter cake is contacted with another liquid while the interior of the cells at the reduced pressure, and a drying during which this reduced pressure is maintained to free the filter as much as possible from liquid.

The filter cells are provided in a pressure vessel into which the suspension is fed under pressure and above the suspension there is usually provided a pressurized gas space in which the gas (for example air) is maintained under a constant pressure.

The pressure in the vessel increases the filtering effect and permits filtration by pressure differential of liquids which may have a high volatility such that it would flash or evaporate upon the application of a subatmospheric pressure equivalent to the pressure differential.

The conventional rotary pressure filters generally comprise sector-shaped filter cells which are assembled into filter disks lying in planes perpendicular to the axis of the rotor and extending outwardly from the filter shaft with means being provided between these disks for removing the filter cake and treating the filter cake.

As a practical matter it has been found that such filters can be operated with filtering areas of 1.6 to 1.7 $m^2$ per $m^3$ of the enclosed volume of the vessel. Naturally as attempts are made to increase the filter area in this type of structure, problems are encountered with removal of the filter cake, the treating devices, etc. and with access of the suspension to the filter surfaces.

While these earlier filters are advantageous for many purposes, their use involves disadvantages which have limited their applicability. For example, the shape of the filter cells, especially when a large number of relatively small filter cells are to be provided, is not compatible with the commercially available shapes of the filter material, e.g. filter fabric, so that cutting and assembling of the filter material in a tedious and time-consuming manner is required. Furthermore, the filter disks cannot be readily mounted on and dismounted from the rotor. It is also a disadvantage that the desired filter surface area can be provided only in stages with significant jumps from one stage to the next, i.e. corresponding to the addition or removal of an entire filter disk.

Of perhaps greater significance is the fact that the filtrate must be led away through the rotor shaft which is of limited flow cross section. Obviously, when attempts are made to increase the flow cross section and hence the diameter of this shaft, the volume of the vessel which might otherwise be occupied by filter surface is taken up with the increased-diameter shaft, thereby reducing the available filter area per unit volume of the vessel.

Experience has shown that with more than four filter disks, two fluid distribution heads are required, one at each end of the filter shaft. Aside from the increased cost which the duplicated distribution head entails, such systems have the disadvantage that it is not always possible to obtain uniform removal of the filtrate and hence the thickness of the cake built up on the filter surfaces is not always constant or the same over the area of each filter disk or from filter disk to filter disk. This means that the filtering effectiveness may vary over the filter surfaces and that at least portions of the recovered solids may have an inordinately high residual moisture content.

OBJECTS OF THE INVENTION

It is a principal object of the present invention to provide an improved rotary filter operable under pressure which will overcome the disadvantages enumerated above and especially over that which has heretofore been considered at optimum in earlier systems.

Another object of the invention is to provide a rotary cell filter of relatively low capital cost and high operating efficiency which is of simple construction and which facilitates the mounting and dismounting of filter cells or filter materials.

Still another object of this invention is to provide an improved pressurized rotary-cell filter which allows all of the operations enumerated above to be carried out more economically than with earlier filters and yet provides an increased filtering surface area for given spatial requirements of the pressurized vessel.

SUMMARY OF THE INVENTION

These objects and others which will become apparent hereinafter are attained, in accordance with the present invention, in a rotary cell filter disposed in a vessel and pressurizable at a superatmospheric pressure, the vessel and its rotor having a horizontal filter axis about which the rotor is rotatable. The rotor comprises a plurality of filter cells designed for continuous filtration and alternatively immersed in a suspension which is introduced under pressure to the vessel and withdrawn for contact with the suspension. The apparatus has a control head (distribution head) whereby the interiors of the filter cells during each revolution of the rotor are subjected sequentially to a pressure less than that prevailing in the pressure vessel (a pressure drop corresponding to the differential pressure for the cake-deposition zone) for withdrawing the filtrate through the filter material of the cells, and to a pressure higher than that prevailing in the vessel (cake-discharge zone).

According to the invention, the filter cells are suspended in the rotor i.e. are affixed at an outer portion of the rotor to the rotatable support thereof and hang inwardly to terminate at a location radially outward of the axis, and are either longitudinally extending (with the filter surface parallel to the filter axis and in cross section at least proximately radially extending away from the filter axis, or are arranged in planes perpendicular to the filter axis and spaced around the latter while being connected to filter-cell conduits arranged around the axis.

The individual filter cells are thus supported and communicate with the respective filter-cell conduits at locations remote from the filter-cell axis and the shaft for the rotor while leaving a space between the orbit of the inner free edges of the cells and the shaft free to accommodate, at least in one quadrant of the rotation of the assembly, a conveyor or like means for carrying away dislodged solids.

With the new filter cell construction, i.e. the individual suspension of filter cells from their outer edges, it has been found to be possible to increase the spatial utilization of the pressure vessel, e.g. to provide 2.3 to 2.4 m$^2$ of filter surface per cubic meter of pressure vessel, a factor which is of the utmost importance in view of the high cost of pressure vessels whereby the overall cost of a filter per unit of filter area can be increased and the spatial efficiency augmented.

The system of the invention has the advantage, moreover, of one-sided filtrate removal and, because the filtrate path does not have to extend at long distances through the rotor shaft, of a sufficient flow cross section for each individual filter cell whereby pressure losses are minimized and filter cakes of especially uniform thickness can be provided over the entire area of the filter surface.

Even with rotor lengths which correspond to those of conventional filters with more than four disks, only a single distribution head has been found to be necessary.

In a first embodiment of the invention, the filter cells or plates extend along the filter axis and are suspended radially inwardly from hanger bars (rails) spaced apart along the outside of the rotor. In a second embodiment, the filtrate conduits run axially along the exterior of the rotor and the filter cells are suspended therefrom and generally have axes which are transverse to the filter axis.

According to a feature of the invention, the filter surfaces of the filter plates are planar and generally rectangular or are of zigzag configuration. It has been found to be desirable in such case to incline the filter plates to the radial direction (referred to the filter axis) at an angle which can be up to 30° but preferably is at most 15°. Furthermore, the radially innermost edges of the filter plates can be slightly inclined to the axis in the direction of the discharge side for the filtrate, preferably at about 1°.

When the zigzag configuration is provided, the effective surface area is sharply increased per unit of volume of the pressure vessel and the same applies when the plates are inclined to the radial direction. The inclination of the plates to the longitudinal axis has the advantage of imparting a displacement to the fluid in the direction of the outlet and thereby accelerates withdrawal of the filtrate before the plates are reimmersed in the suspension.

According to another feature of the invention, the filter cells affixed to the filter cell conduits all lie at the same level, i.e. are aligned with one another and have trapezoidal filter surfaces such that neighboring lateral edges are closely juxtaposed and practically contiguous while being preferably parallel to one another. In this case a relatively large filter area can be provided per unit volume as is the case when the filter cells are generally candle shaped, i.e. of generally round and preferably circular cross section so that corresponding filter members of all of the filtrate conduits lie in the same planes perpendicular to the axis.

According to yet another feature of the invention, the connection between the interior of the filter cells and the filter cell conduits is formed by filtrate tubes which open into the interior of the filter cells close to the free inner ends thereof. This ensures a practically complete removal of the filtrate from the cells.

In all of the embodiments it has proved to be advantageous to provide the filter cells so that they can be shifted into and out of the rotor, for example with the respective conduits, through openings in the pressure vessel in the axial direction, thereby facilitating replacement and minimizing the time required for such replacement.

The precise number of filter cells which may be required for a particular task can then be established with ease and a stepless selection of filter surface can be provided.

According to yet another feature of the invention, the rotor is formed with agitator bars which serve to stir and mix the suspension so that additional agitating devices are not required.

According to an important feature of the invention, a space between the axis and the radially innermost edges of the filter cells is left free to accommodate a collecting chute or funnel and a conveyor belt whereby the dislodged cake can be removed from the pressure vessel. This construction has been found to be particularly advantageous since the fluid distributor can be provided at one axial end of the rotor while the discharge device passes through the opposite axial end thereof.

The ends of the pressure vessel are advantageously domed structures, one of which is permanently affixed to the cylindrical central portion while the other is removably mounted, e.g. by a flange connection, to the cylindrical part, this latter dome being formed with the discharge means. The two parts may be readily spread in the axial direction by mounting one or both of these parts on wheels.

The rotor can be formed with a pair of end plates or support frames through which the filter plates or arrays of filter cells can be inserted and withdrawn axially, the filter plates or supports being connected by bars which form rails along which the filter cells are displaced. The webs of these rails, which are T or double-T configuration, can be provided with openings promoting agitation and reducing flow resistance.

While the invention has been found to be especially effective when applied to pressurized filters, some of the features described are applicable to filters which are not enclosed in a pressure vessel.

BRIEF DESCRIPTION OF THE DRAWING

The above and other objects, features and advantages of the invention will now be described in detail with reference to the accompanying drawing in which:

FIG. 5 is an axial section through a portion of a rotor of another embodiment of the invention;

FIG. 6 is a cross-sectional view taken along the line VI—VI of FIG. 5;

FIG. 7 is a view similar to FIG. 5 showing still another embodiment of the invention; and FIG. 8 is a cross-sectional view taken along the line VIII—VIII of FIG. 7.

SPECIFIC DESCRIPTION

Figure 1:
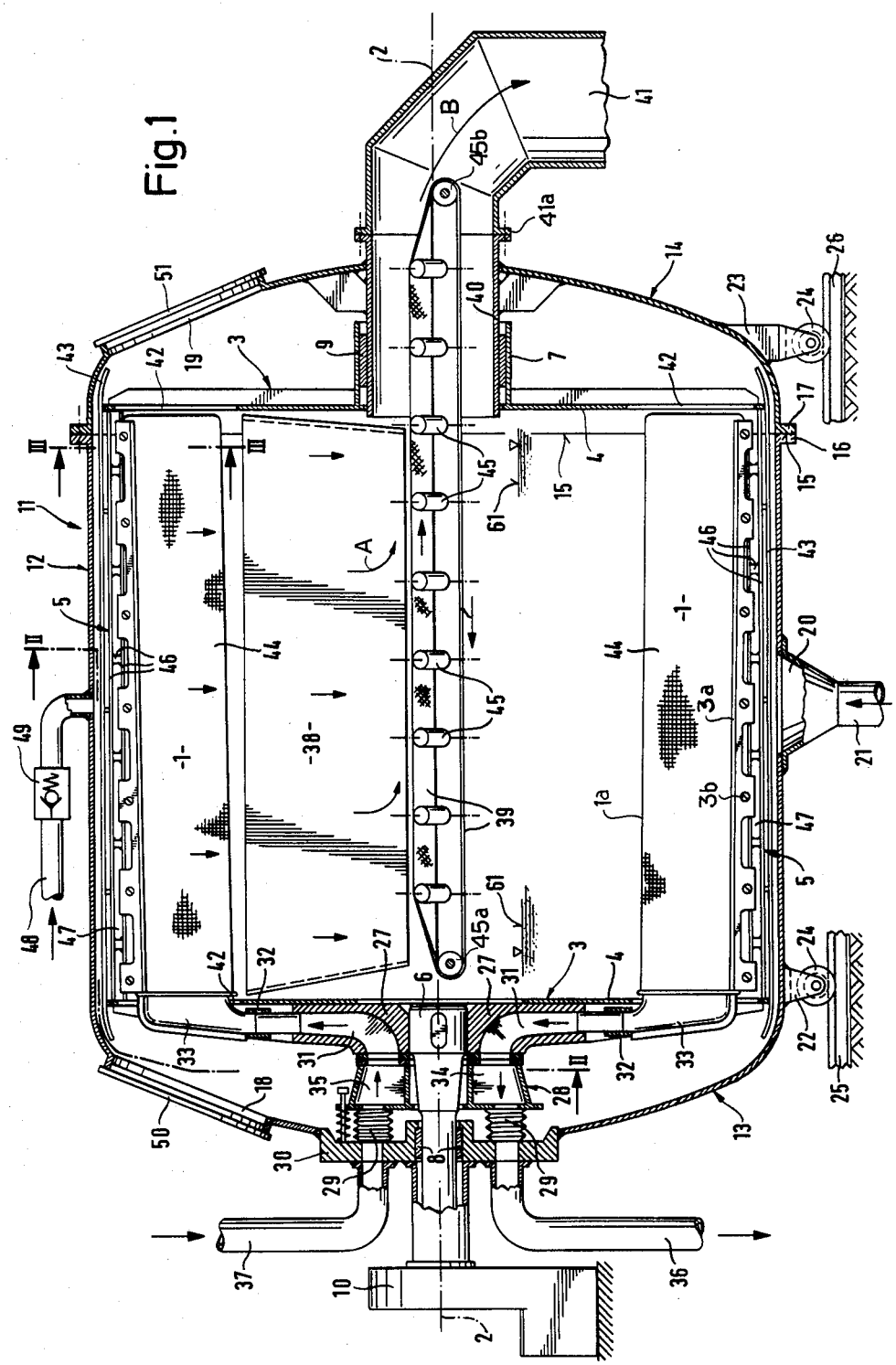
FIG. 1 is a vertical longitudinal (axial) cross section view through a pressurizable rotary cell filter embodying the invention.

The rotary cell filter shown in FIG. 1. comprises a multiplicity of angularly equispaced substantially rectangular filter plates 1 which are disposed in a starlike array substantially parallel to but extending radially away from a filter axis 2 and which are suspended in a rotor 3. The rotor 3 comprises a pair of end walls 4 bridged by struts 5 to which the outer edges of the respective filter plates are attached by strips or brackets 3a and bolts 3b.

The rotor 3, constituted by the two end walls 4 and the annularly equispaced axially extending struts 5, is journaled in the pressure vessel by means of axially aligned stub shafts 6 and 7 via bearings 8 and 9, respectively, so that the rotor, together with the filter plates 1, can be driven by a drive means 10 constituted by an electric motor and a transmission.

During the rotation of the rotor, the filter plates are successively immersed in a suspension and then withdrawn therefrom.

The suspension is contained in a filter trough formed by a pressure vessel 11 designed to be capable of sustaining a superatmospheric pressure of, say, 3 to 4 bar and which encloses the rotor 3 and the filter plates suspended from the outer bars thereof.

The level of the suspension has been represented at 61 in FIG. 1 and is maintained by feeding the suspension to the vessel as the solids and liquids are withdrawn therefrom, the latter through the filter while the former are deposited as filter cakes on the filter surfaces.

The pressure vessel 11 comprises a cylindrical central portion 12 and two outwardly convex domed ends 13 and 14, the dome 13 being welded permanently to the cylindrical portion 12 and carrying the bearing 8 at the driving end of the rotor.

The opposite axial end of the cylindrical portion 12 and the dome 14 define a supporting junction 15 at which the respective flanges 16 and 17 can be bolted or clamped together to maintain the vessel hermetically sealed.

Each of the domed members 13 and 14 is provided with a respective cover 50 or 51 to close manholes or service openings 18 and 19 dimensioned to permit exchange and replacement of the filter plates and maintenance work on the interior of the filter apparatus.

At the bottom of the cylindrical portion 12, the pressure vessel 11 is provided with a fitting 20 which is connected to a pipe 21 through which the suspension is supplied at a pressure above that prevailing in the pressure vessel.

At the top of the cylindrical portion 12 of the pressure vessel 11 is connected with a pipe 48 which communicates with a compressed air source and which includes a check valve 49, for maintaining the gas pressure within the vessel.

Below the vessel part 12, 13 there is provided a carriage or truck 22 while a corresponding truck is provided on the other vessel part 14 as shown at 23, these trucks having wheels 24 which ride upon rails 25 and 26 extending parallel to the axis 2 and permitting, upon disengagement of the flanges 16 and 17 for the axial separation of the two parts for repair and cleaning.

The end wall 4 of rotor 3 at the driving side of the latter is connected to a filtrate guide body 27 which is rotatable but in communication with a control head or distribution head 28 connected by yieldable (bellows-type) conduits 29 which form axial compensators maintaining the distribution head 28 against the guide body 27 in spite of temperature changes. The axial compensators 29 engage a fixed plate 30 which carries the bearing 8 mentioned previously and forms part of the dome 13.

The filtrate guide body 27, is formed with a multiplicity of angularly equispaced passages 31 which extend axially and radially, the number of passages 31 corresponding to the number of filter plates 1.

Each filter plate 1 is provided with a filtrate duct 33 extending through a cutout 42 in the drive-side wall 4 and connected by a pipe coupling 32 with a respective filtrate passage 31 of the body 27.

The distribution head 28 can be formed with a plurality of compartments, e.g. the compartments 34 and 35, which successively communicate with the passages 31 of body 27 and communicate via pipes 36 and 37, respectively, with a source of air pressure less than that prevailing in the vessel (e.g. ambient pressure) and a source of air pressure above that prevailing in the vessel (e.g. an air compressor).

The control head 28 thus has the obvious functions. More specifically, it provides, at predetermined locations in the travel of the filter cells, i.e. the filter plates, the pressure level required for the particular function in the interior of the cell. Thus the reduced pressure (by comparison with the pressure in the vessel) is applied when the cell is immersed in the suspension to draw filtrate through the filter material and deposit the cake, for draining of the filter cake when the latter is lifted out of the suspension, for any rinsing of the filter cake and for any drying of the filter cakes. The compressed air is supplied to dislodge the filter cake.

The filter cell 1 shown at the bottom of FIG. 1 communicates via the passage 33, 32, 31, 34 with the low-pressure duct 36 for cake formation by deposition of solids from the suspension and withdrawal of the filtrate.

The filter plate 1 shown immediately above is considered to be in the zone at which the filter cake is dislodged and thus communicates via its passage 33 with the passage 35 and the high-pressure duct 37. The cake on the filter medium 44 of this filter cell is thus dislodged and falls in the direction of the arrows for collection and removal of the vessel.

The filter plates 1 extend radially inwardly from the fastening bars 5 but terminate short of the filter axis 2 with the spacing from the latter which is about two-thirds of the radius of the rotor, i.e. the filter plates extend radially about one-third of this radius.

The space between the path of the radially innermost edge 1a and the filter axis is left to accommodate the collecting device for the filter cake which has the configuration of an endless band conveyor 39, into which the filter cake is directed by a chute or apron 38 in the configuration of an elongated funnel below which the conveyor extends.

The conveyor has an upper pass of V configuration defined by rollers 45 inclined to the horizontal (see especially FIGS. 1 and 2) and is passed over terminal rollers 45a and 45b which may be driven by an electric motor, not shown, to advance the collected solids in the direction of the arrows A and B, i.e. to the right.

A connecting pipe 40, welded to the dome 14 and carrying the bearing 9, forms an outlet through which the conveyor extends and terminates in a discharge gate a part of which has been illustrated at 41 and through which the solids are discharged. The gate, which has not been illustrated in detail, is designed to pass the solids while maintaining the pressure within the vessel and can be of any desired configuration.

The outlet 41 is connected by a flange 41a to the pipe 40, so that it is removable to afford access to the conveyor for maintenance or removal of the latter.

The fastening bars 5 for the rotor have the configuration of double-T rails as illustrated at 46 with through-going openings. Outwardly of these rails and affixed thereto, are provided agitating bars 43 which, upon rotation of the rotor, agitate and mix the suspension so that additional stirrers are not required.

Figure 2:
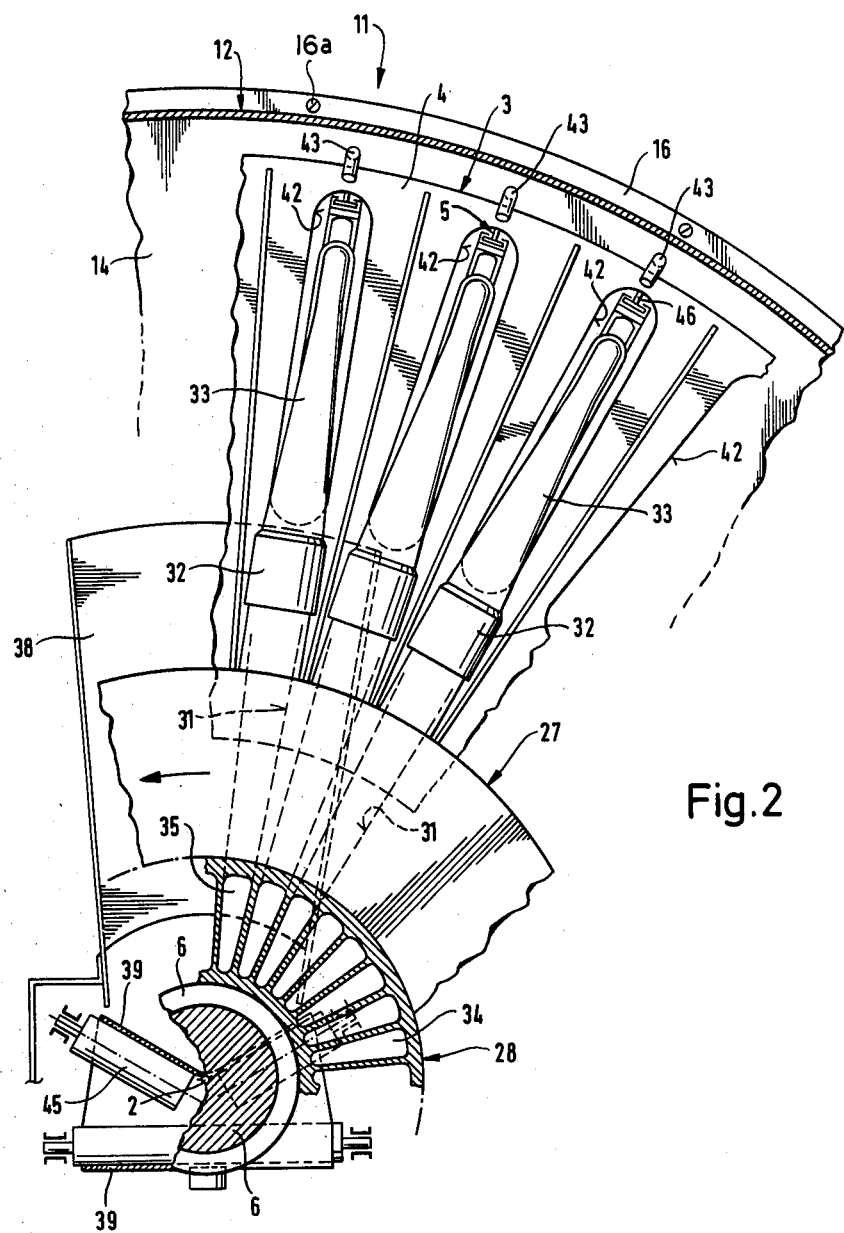
FIG. 2 is a cross section taken along the line II—II of FIG. 1, drawn to a larger scale.

FIG. 2 shows additional details of this construction and from this figure it will be apparent that the central portion 12 of the pressure vessel carries the circumferential flange 16 along which the connecting bolts 16a are shown to be spaced. The section of FIG. 2 is also taken through the shaft 6 and partly to the distributing head 28 in which the passages 34 and 35 are apparent.

This view shows in elevation the filter guide body 27 with the passages 31, the pipe or tube couplings 32 and the filtrate conduits 33 which pass through the openings or cutouts 42 in the drive-side end wall 4.

This figure also makes it clear that these cutouts are such size as to permit the filter plates to be inserted, e.g. through the manhole 18 upon removal of the cover 50, axially. The bars 3a for securing the filter cells on the rails 46 are shown to be formed with T-slots enabling the axial shift of these filter plates along the bars. The agitators 43, in the form of tubes, are also shown here.

Figure 3:
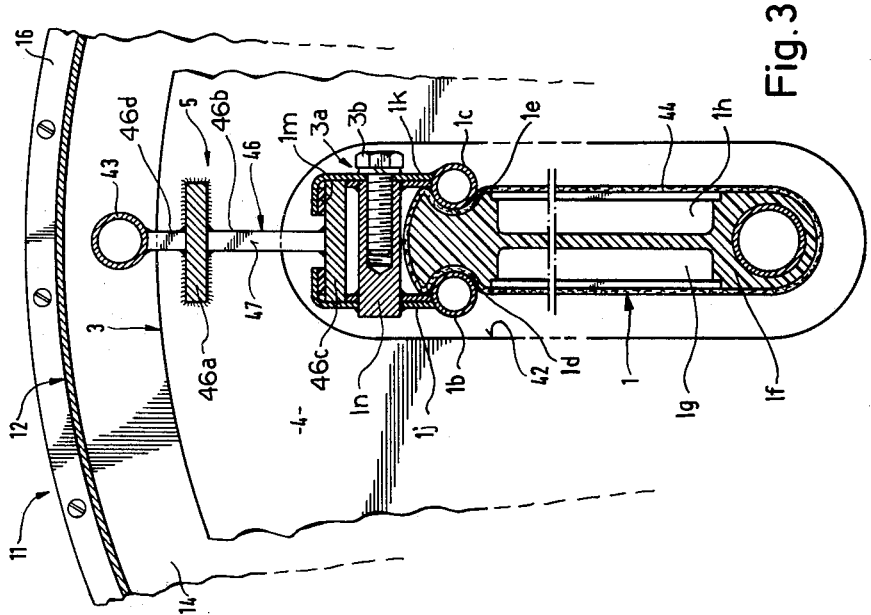
FIG. 3 is a cross section taken along the line III—III of FIG. 1 drawn to yet a larger scale than FIG. 2.

A filter plate 1 provided with the filtering medium in the form of a filter fabric 44 is shown in greater detail in FIG. 3 together with the construction of the double-T rail 46. This rail has an upper flange 46a which is welded to the plates 4, a web 46b extending radially inwardly from the flange 46a and provided with the openings 47, and a lower flange 46c along with the cutouts 42. An upwardly extending web 46d carries the agitator 43.

The fastening assembly 3a comprises, as here shown, a clamp which includes a pair of tubular rods 1b and 1c which serve to hold the filter fabric 44 in two grooves 1d and 1e of a synthetic-resin body 1f constituting a filter frame provided with chambers 1g and 1h which communicate with the respective filter conduit 33. The tubes 1b and 1c are each connected to brackets 1j and 1k which are bent over the flange 46c along with low friction material at 1m, e.g. polytetrafluoroethylene and are drawn together by the bolt 3b which is screwed into an internal threaded spaced 1n affixed to one of the brackets.

With this construction, therefore, each filter plate can be shifted axially along the flange 46c of its fastening bar 46 through the opening 42 in one of the endplates while another filter plate is inserted from the opposite end upon disconnection of the respective conduit 33.

The openings 47 reduce the suspension to rotation of the rotor while the portions of the web 46b between the openings increase the agitation of the suspension and permit any portions of the suspension which are entrained by the rotor to flow away rapidly.

Figure 4:
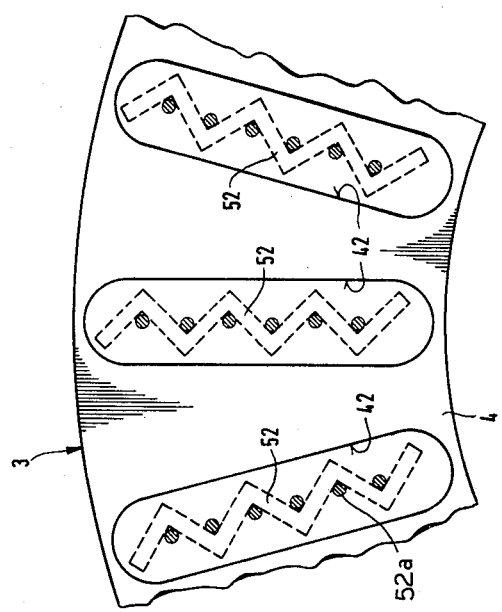
FIG. 4 is a cross section through a filter plate for use with filter cells different from those of FIGS. 1–3 and constituting another embodiment of the invention.

As can be seen from FIG. 4, the filter plates which are used in the construction of FIGS. 1–3 can also have a zigzag configuration in cross section so that the filter surfaces have a washboard configuration as opposed to the planar configuration shown in FIG. 1. This, naturally, increases the available surface area upon which the solids can collect. The filter plates 52 in this embodiment are supported by rods 52a to enable them to be axially shifted into and out of the openings 42. The filtrate pipe has not been shown in this Figure.

FIGS. 5 and 6 show a variation of the filter in which a plurality of filter cell conduits 54, in annularly spaced relationship, extend axially across the rotor and are suspended by respective brackets 55 from the support bars 46 previously mentioned. From each of these conduits, there are suspended a succession of mutually parallel filter cells 56 of trapezoidal configuration.

The filter cell conduits 54 are shown to extend through the opening 42 in the left-hand end wall in FIG. 5 and are connected by respective pipe couplings 32 (as described in connection with FIG. 1) with the passage 31 in the filtrate guide body 27.

The interior of each filter cell conduit 54 communicates with the interior of the respective filter cells 56 by respective filtrate tubes 57, the filtrate tubes opening with bends to the left in the conduit, i.e. to the filtrate discharge side.

Each of the filtrate tubes reaches close to the bottom of the respective filter cell and opens, therefore, close to the inner edge thereof.

In a manner similar to that described in connection with FIG. 1, the filter cell conduits are suspended with the respective filter cells slidably from the double-T rails 46 which can be formed with the openings 47 previously described and carry plates 53 which project radially to form agitator bars.

As can be seen from FIG. 6, the radially extending edges of the filter cells 56 lying in a common plane perpendicular to the filter axis are parallel to the edges of adjacent filter cells and practically contiguous.

Each assembly of conduits and suspended filter cells can be shifted axially into and out of place upon removal of the respective pipe coupling and through the manholes of the pressure vessel in the manner described.

FIGS. 7 and 8 show an arrangement in which the filter cell conduits 58 correspond to the conduits 54 previously described and have tubes 60 extending into the candle-shaped filter cells 59 which are mounted on these tubes. The filter cells 59 are of circular cross section and are aligned both in the axial direction along a respective conduit and with corresponding filter cells of other conduits in respective radial planes.

We claim:

1. A rotary filter for the continuous filtration of a suspension to produce a filter cake and a filtrate, said rotary filter comprising:
    a vessel adapted to receive said suspension;
    a rotor mounted for rotation in said vessel and having a generally horizontal axis, said rotor being formed at one axial end with a distribution head connected to a source of elevated pressure and a source of reduced pressure and provided with respective conduits successively connected to said sources by said head upon rotation of said rotor, said rotor being further provided with cell-mounting elements along its outer periphery;
    a plurality of angularly spaced filter cells suspended from said elements and extending inwardly to terminate at a distance from said axis while communicating with said conduits whereby filtrate is withdrawn from said cells to deposit said cake thereon as said cells are immersed in said suspension and said cake is dislodged from said cells by fluid pressure therein at a location in the path of said cells about said axis; and
    means in said vessel disposed at least in part in a space within an orbit of inner edges of said cells for withdrawing dislodged filter cake from said vessel, said vessel comprising a first dome at said end of said rotor forming a rotatable support for said rotor and said head, a cylindrical member fixed to said first dome and surrounding said rotor, and a second dome detachably connected to said cylindrical member, said means in said vessel for withdrawing said filter cake including a conveyor discharging said cake through said second dome, said domes being provided with closable access windows alignable with said filter cells for the removal and replacement of said filter cells on said rotor, said rotor comprising a pair of end plates with openings corresponding to said filter cells and alignable with said windows, said elements being rails extending axially between said end plates, and said filter cells being operatively connected with brackets slidably engaging said rails for the axial displacement of said filter cells along said rails, said first dome and said cylindrical member forming one part said second dome forming another part of a pressurizable enclosure constituted by said vessel, one of said parts being separable from the other, said vessel being formed with means for pressurizing the interior thereof.

2. The rotary filter defined in claim 1 wherein said rails comprise flanges engaged by said brackets and webs connected to said flanges and formed with openings reducing the resistance of said rotor to passage through said suspension.

3. The rotary filter defined in claim 1 wherein said filter cells extend axially along said rotor and hang generally radially inwardly while communicating with the respective conduits at one axial end of said rotor.

4. The rotary filter defined in claim 3 wherein said filter cells are generally rectangular and form planar filter plates.

5. The rotary filter defined in claim 3 wherein said filter cells are rectangular and are zigzag in cross section.

6. The rotary filter defined in claim 3 wherein the filter cells are filter plates inclined to the radial direction from said axis by up to 30°.

7. The rotary filter defined in claim 3 wherein each filter cell is a filter plate having an inner longitudinal edge inclined to said axis at an angle of about 1° toward said axial end of said rotor.

8. The rotary filter defined in claim 1 wherein each of said conduits extends axially along the exterior of said rotor and carries a plurality of axially spaced filter cells communicating with each conduit and suspended therefrom.

9. The rotary filter defined in claim 8 wherein the corresponding filter cells of all of said conduits lie in respective planes perpendicular to said axis.

10. The rotary filter defined in claim 9 wherein each of said filter cells is trapezoidal in the respective plane perpendicular to said axis and has lateral edges parallel to the lateral edges of adjacent filter cells and closely juxtaposed therewith.

11. The rotary filter defined in claim 8 wherein each of said filter cells has a substantially circular cross section and is radially elongated.

12. The rotary filter defined in claim 8, further comprising a filtrate tube communicating with each of said filter cells close to the end thereof proximal to said axis and opening into the respective conduit.

13. The rotary filter defined in claim 1 wherein the means for withdrawing said cake constitutes a chute disposed in said space for collecting the dislodged cake, said conveyor being disposed below said chute for carrying the collected cake out of said vessel.

14. A rotary filter for the continuous filtration of a suspension to produce a filter cake and a filtrate, said rotary filter comprising:
    a vessel adapted to receive said suspension;
    a rotor mounted for rotation in said vessel and having a generally horizontal axis, said rotor being formed at one axial end with a distribution head connected to a source of elevated pressure and a source of reduced pressure and provided with respective conduits successively connected to said sources by said head upon rotation of said rotor, said rotor being further provided with cell-mounting elements along its outer periphery;
    a plurality of angularly spaced filter cells suspended from said elements and extending inwardly to terminate at a distance from said axis while communicating with said conduits whereby filtrate is withdrawn from said cells to deposit said cake thereon as said cells are immersed in said suspension and said cake is dislodged from said cells by fluid pressure therein at a location in the path of said cells about said axis; and means in said vessel disposed at least in part in a space within an orbit of inner edges of said cells for withdrawing dislodged filter cake from said vessel, said vessel comprising a first dome at said end of said rotor forming a rotatable support for said rotor and said head, a cylindrical member fixed to said first dome and surrounding said rotor, and a second dome detachably connected to said cylindrical member, means in said vessel for withdrawing said filter cake including a conveyor discharging said cake through said second dome, said domes being provided with closable access windows alignable with said filter cells for the removal and replacement of said filter cells on said rotor, said rotor comprising a pair of end plates with openings corresponding to said filter cells and alignable with said windows, said elements being rails extending axially between said end plates, and said filter cells being operatively connected with brackets slidably engaging said rails for the axial displacement of said filter cells along said rails, said first dome and said cylindrical member forming one part and said second dome forming another part of said vessel, one of said parts being separable from the other.

15. The rotary filter defined in claim 14 wherein the filter cells are filter plates inclined to the radial direction from said axis by up to 30°.

16. The rotary filter defined in claim 14 wherein each filter cell is a filter plate having an inner longitudinal edge inclined to said axis at an angle of about 1° toward said axial end of said rotor.

17. The rotary filter defined in claim 14 wherein the means for withdrawing said cake includes a chute disposed in said space for collecting the dislodged cake, and said conveyor is disposed below said chute for carrying the collected cake out of said vessel.

* * * * *